US012417719B2

(12) United States Patent
Graff

(10) Patent No.: US 12,417,719 B2
(45) Date of Patent: Sep. 16, 2025

(54) SPORTS LINEUP DISPLAY TOOL

(71) Applicant: Graff Public Solutions, LLC, Glastonbury, CT (US)

(72) Inventor: Kevin Graff, Glastonbury, CT (US)

(73) Assignee: GRAFF PUBLIC SOLUTIONS, LLC, Glastonbury, CT (US)

( * ) Notice: Subject to any disclaimer, the term of this patent is extended or adjusted under 35 U.S.C. 154(b) by 45 days.

(21) Appl. No.: 18/092,739

(22) Filed: Jan. 3, 2023

(65) Prior Publication Data

US 2023/0274668 A1 Aug. 31, 2023

Related U.S. Application Data

(60) Provisional application No. 63/314,820, filed on Feb. 28, 2022.

(51) Int. Cl.
*G09F 7/04* (2006.01)
*A63B 71/06* (2006.01)
*A63B 102/18* (2015.01)

(52) U.S. Cl.
CPC ............ *G09F 7/04* (2013.01); *A63B 71/0616* (2013.01); *A63B 2102/18* (2015.10)

(58) Field of Classification Search
CPC ... G09F 7/04; A63B 71/0616; A63B 2102/18; A63B 2071/0602; A63B 2209/08; A63B 2209/10
See application file for complete search history.

(56) References Cited

U.S. PATENT DOCUMENTS

| | | | | | |
|---|---|---|---|---|---|
| 402,700 | A * | 5/1889 | Van Zile ............ | A63B 71/0672 273/DIG. 26 |
| 1,042,142 | A * | 10/1912 | Pohlig ................. | A63F 3/00031 116/222 |
| 2,063,612 | A * | 12/1936 | Marshall ............ | A63B 71/0672 273/DIG. 26 |
| 2,481,709 | A * | 9/1949 | Adams ............... | A63B 71/0672 273/DIG. 26 |
| 4,018,445 | A * | 4/1977 | Anania, Sr. ........... | A63F 3/0415 273/153 R |
| 5,664,780 | A * | 9/1997 | Bricker .................. | A63B 71/06 116/222 |
| 2006/0043673 | A1* | 3/2006 | Brown .................. | A63B 71/06 273/148 R |

OTHER PUBLICATIONS

Jacer Products Line Up Board for Baseball Softball, Sep. 10, 2021, https://www.gosupps.com/jacer-products-line-up-board-for-baseball-softball-athlete-tough-aluminum-board-reliable-hook-and-loop-positions-that-won-t-get-lost-includes-twelve-name-plates-for-all-players-on-the-team.html (Year: 2021).*

* cited by examiner

*Primary Examiner* — Cassandra Davis
(74) *Attorney, Agent, or Firm* — CANTOR COLBURN LLP

(57) ABSTRACT

A display system for a sporting event includes a display base, a first set of display items affixable to said display base, and a second set of display items affixable to said display base. A first type of information relevant to the sporting event is presentable on the first set of display items and a second type of information relevant to the sporting event is presentable on the second set of display items. The first type of information is different from the second type of information.

13 Claims, 4 Drawing Sheets

SPORTS LINEUP DISPLAY TOOL

CROSS-REFERENCE TO RELATED APPLICATIONS

This application claims the benefit of U.S. Provisional Application No. 63/314,820 filed Feb. 28, 2022, the disclosure of which is incorporated herein by reference in its entirety.

FIELD

Embodiments of the present disclosure relate to the art of a display device, and more particularly, to a display device for representing the line-up of a team during one or more timed segments of a sporting event.

BACKGROUND

Developing a line up for a sporting event, particularly a sporting event in which each team includes several positions, such as baseball for example, can be complicated. Further, the rules applicable to the line-up may vary based on the level of the sporting event (various levels of Little League, high school baseball, college baseball, professional baseball, etc.), thereby adding complexity. For example, in Little League baseball, every player must play a set number of innings at specific positions. Currently, no readily available tool exists that allows for efficient creation and display of a modifiable team lineup for a sporting event.

BRIEF DESCRIPTION

According to an embodiment, a display system for a sporting event includes a display base, a first set of display items affixable to said display base, and a second set of display items affixable to said display base. A first type of information relevant to the sporting event is presentable on the first set of display items and a second type of information relevant to the sporting event is presentable on the second set of display items. The first type of information is different from the second type of information.

In addition to one or more of the features described above, or as an alternative, in further embodiments the at least one of said first set of display items and said second set of display items is affixable to said display base via a magnet.

In addition to one or more of the features described above, or as an alternative, in further embodiments the at least one of said first set of display items and said second set of display items is affixable to said display base via an adhesive.

In addition to one or more of the features described above, or as an alternative, in further embodiments the at least one of said first set of display items and said second set of display items is affixable to said display base via insertion of a portion of said display items into said display base.

In addition to one or more of the features described above, or as an alternative, in further embodiments the sporting event is a baseball game.

In addition to one or more of the features described above, or as an alternative, in further embodiments said first set of information includes a roster of participants in the sporting event.

In addition to one or more of the features described above, or as an alternative, in further embodiments said second set of information includes one or more positions associated with a team participating in the sporting event.

In addition to one or more of the features described above, or as an alternative, in further embodiments comprising a third set of display items affixable to said display base, wherein a third type of information relevant to the sporting event is presentable on said third set of display items.

In addition to one or more of the features described above, or as an alternative, in further embodiments said third type of information represents one or more segments of the sporting event.

In addition to one or more of the features described above, or as an alternative, in further embodiments said third type of information represents one or more players that are not assigned a position during a period of the sporting event.

In addition to one or more of the features described above, or as an alternative, in further embodiments said third set of display items is visually distinct from said first set of display items and said second set of display items.

In addition to one or more of the features described above, or as an alternative, in further embodiments said third set of display items comprises a plurality of non-positionally indicative magnets.

In addition to one or more of the features described above, or as an alternative, in further embodiments at least one of a size and a shape of the first set of display items is different than the size and the shape of the second set of display items.

In addition to one or more of the features described above, or as an alternative, in further embodiments at least one of said first set of display items and said second set of display items is modifiable.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
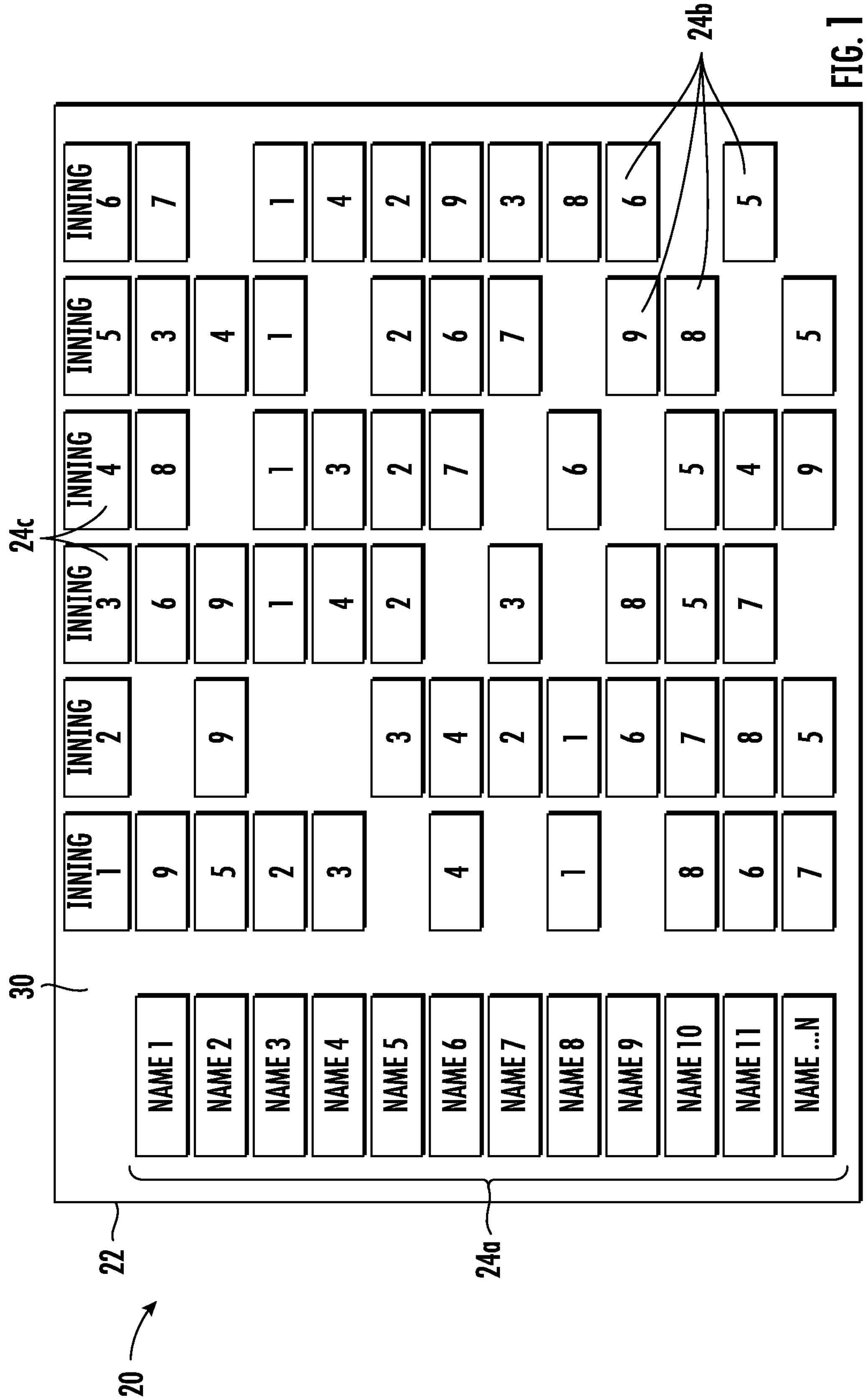
FIG. 1 is a front view of a display system for a sporting event according to an embodiment.

With reference now to FIG. 1, an example of a display system 20 associated with a sporting event is illustrated. In an embodiment, the display system 20 is used to display a "line up" or a list of players of one or more teams participating in the sporting event as well as the position that each player will be filling during one or more periods, segments, or innings of the sporting event.

Figure 2:
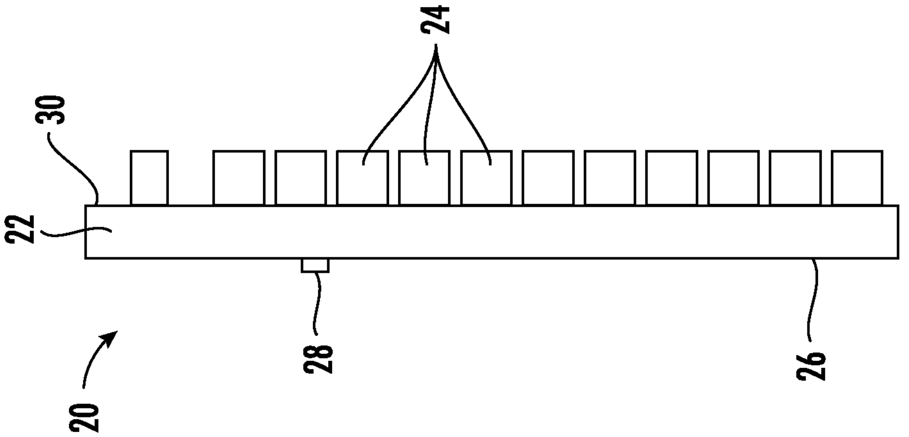
FIG. 2 is a side view of a display base of the display system according to an embodiment.

As shown, the display system 20 includes a display base 22 and a plurality of display items 24 removably affixable or attachable to the display base 22. In the illustrated, non-limiting embodiment, the display base 22 is generally rectangular in shape. The size of the display base 22 may be selected so that the display system 20 is easily transportable between various locations by a single person. However, it should be understood that the size and shape of the display base 22 may vary based on the total number of participants, positions, and periods/innings to be represented thereon. In an embodiment, best shown in FIG. 2, the display base 22 includes a hook, bracket, or other suitable connector 28, such as at a back surface 26 of the display base 22 for example, to allow the display base to be mounted to a wall or other surface (such as a dugout wall or fence).

Figure 3C:
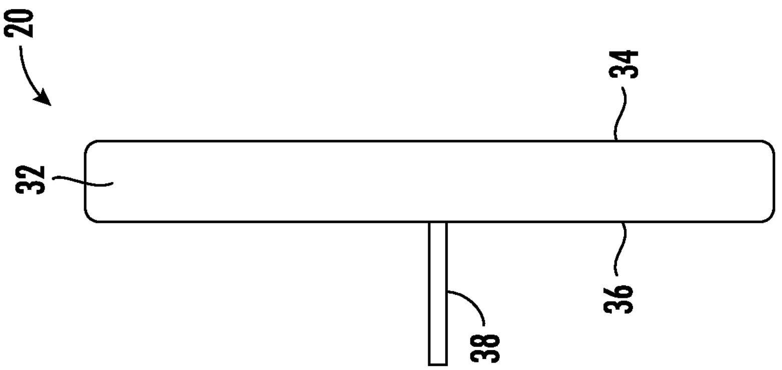
FIGS. 3A-3C are side views of various display items connectable to the display base according to an embodiment.
Figure 3B:
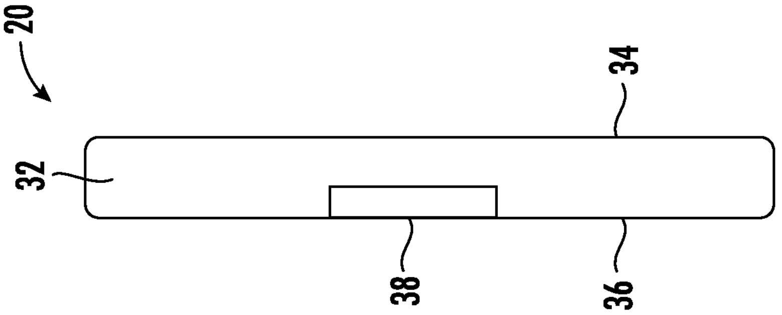
Figure 3A:
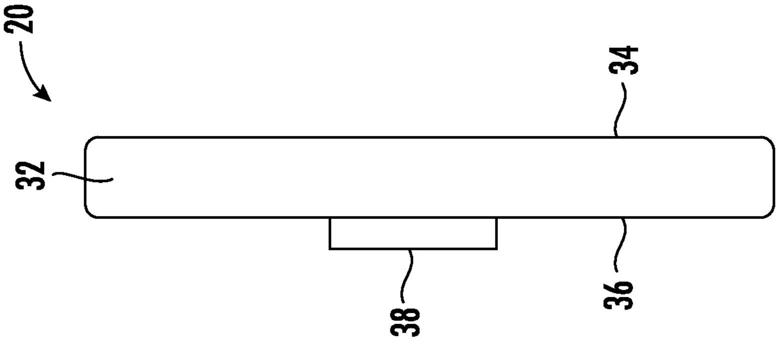

In an embodiment, the plurality of display items 24 may be attachable to a front surface 30 of the display base 22. As best shown in FIGS. 3A-3C, one or more of the plurality of display items 24 includes a body 32 having a first, forward facing surface 34, and a second, rearward facing surface 36. The affixing portion 38 may be positioned adjacent to the second surface 36 such that when the display item 24 is connected to the display base 22, and more specifically the affixing portion 38 is attached to the front surface 30, the forward facing surface 34 of the display item 24 is visible at the front surface 30 of the display base 22. In an embodiment, the affixing portion 38 may be mounted to and/or extend from or beyond the second surface 36 of the body 32 (see FIGS. 3A and 3C) In another embodiment, best shown in FIG. 3B, the affixing portion 38 may be embedded within the body 32.

As will be described herein in more detail, examples of the removably affixable relationship between the display base 22 and the display items 24 may be formed using one or more of a magnet, an adhesive, a hook and look fastening, and a press-fit connection for example. A material of a front surface 30 of the display base 22 is complementary to the affixing portion 38 of each the plurality of display items 24 such that the plurality of display items 24 cooperate with the display base 22 to couple thereto. In the illustrated, non-limiting embodiment, the front surface 30 of the display base 22 is magnetic and the affixing portion 38 of the plurality of display items 24 connectable to the front surface 30 includes a magnet. Although the display base 22 is illustrated as a dry-erase board in FIG. 4, embodiments where the display base 22 has another magnetic configuration, such as a chalkboard for example, are also within the scope of the disclosure. Alternatively, the front surface 30 of the display base 22 may be formed from a soft material, such as cork board for example, and the affixing portion 38 of the plurality of items 24 may include a pointed post (see FIG. 3C) insertable into the material of the display base 22, similar to a thumbtack. In yet another embodiment, the front surface 30 of the display base 22 may be formed from any suitable material, and the affixing portion 38 of the plurality of items may include a removable adhesive, such as reusable poster tack or putty for example.

In yet another embodiment, the front surface 30 of the display base 22 may be formed from a felt or other similar material, and the affixing portion 38 of plurality of items affixable to the front surface 30 may include Velcro® or another suitable material. In such embodiments, the front surface 30 of the display base 22 and the affixing portion 38 of each of the plurality of display items 24 configured to engage the front surface 30 form a hook and loop connection. Further, it should be understood that such a hook and loop connection includes not only embodiments where the display base 22 forms the ladder portion and the plurality of display items 24 form the hook portion of such a connection, but also embodiments where the display base 22 forms the hook portion and the plurality of display items 24 form the ladder portion of such a connection are also contemplated herein. It should be understood that the front surface 30 and affixing portions 38 described herein are intended as an example only and that any suitable combination that allows the plurality of items 24 to be repeatedly attached and separated from the front surface 30 of the display base 22 are within the scope of the disclosure.

The plurality of display items 24 includes one or more distinct sets of display items. For example, in the illustrated, non-limiting embodiment, the plurality of items includes a first set of display items **24*a* representing a first type of information relevant to the sporting event and a second set of display items 24*b* representing a second type of information relevant to the sporting event. The second type of information is different from the first type of information. As shown, the first type of information presented by the first set of display items 24*a* is a roster. Accordingly, each item of the first set of display items 24*a* identifies a distinct or unique player of a team participating in the sporting event. These items 24*a*** may also be ordered to create a modifiable batting order, which is particularly useful in Little League, where the rules dictate that the batting order must change from game to game.

Similarly, the second type of information presented by the second set of display items **24*b* relates to the positions of a team participating in a sporting event. Accordingly, each item 24*b* may be associated with a respective position of a team. The position may be written out or alternatively, may be represented by shorthand, an abbreviation, or other suitable indicator. Each of the positions of a baseball team has a number associated therewith. For example, the pitcher is represented by the number 1, the catcher is represented by the number 2, the first baseman is represented by the number 3, second baseman as 4, third baseman as 5, short stop as 6, left fielder as 7, center fielder as 8, and right fielder as 9. Occasionally, an additional spot is added (perhaps a 4th outfielder 10), making modifiable items 24*b* particularly useful. In the illustrated, non-limiting embodiment, each of the second set of display items 24*b* has a position of a baseball team numerically represented thereon. Of course, letter abbreviations for each of these items 24*b* can be used as well, and respectively include P, C, 1B, 2B, 3**B, SS, LF, CF, and RF.

The plurality of items may additionally includes a third set of display items **24*c* representing a third type of information relevant to the sporting event. In an embodiment, the third type of information includes a respective period or segment of the sporting event. When the display system 20 is used for a baseball game, the third type of information reflects each of the innings. In the illustrated, non-limiting embodiment, the third set of display items 24*c* represents innings 1-6 of a Little League baseball game. However, in embodiments where the display system 20 is used for a football game or soccer game, the third type of information may reflect each quarter or half of the game, and in embodiments where the display system is used for a hockey game, the third type of information may reflect the periods of the game. The total number of segments or periods represented by the third set of display items 24*c* may therefore vary based on the type of sporting event, and/or based on the sport level (little league, high school, college, minor league, major league, etc.) of the sporting event. However, is should be understood that embodiments where the segments of the sporting event are not provided by display items, such as embodiments where the segments are written or otherwise displayed directly on the front surface 30** in a permanent or removable for example, are also within the scope of the disclosure.

A user may position the plurality of display items about the front surface 30 of the display base 22 to indicate a respective player associated with each position for each of the identified segments or periods of the sporting event. As shown, the first set of display items 24*a* is arranged at a left hand side of the front surface 30 and the third set of display items 24*c* is arranged across the top of the front surface 30. A corresponding display item from the second set of the display items 24*b* is affixed to the display base 22 in alignment with one of the first set of display items 24*a* and one of the third set of display items 24*c* to identify a position of a respective player in each respective period or inning.

The configuration of the plurality of display items may be similar, or alternatively, may vary. In embodiments including one or more distinct sets of display items, such as first set of display items 24*a*, a second set of display items 24*b*, and/or a third set of display items 24*c* for example, the items within each set of display items may be substantially identical in size, shape. However, the size and shape of the display items within the first set may be the same, or alternatively, may vary from the size and shape of the display items within the second set and/or the third set. In an embodiment, the information represented by at least one of the display items of the first set, second set, and third set, may be easily changed or modified. For example, the front surface 34 of the body 32 of an item may allow a name, number, position, or other piece of identifying information to be written thereon and easily erased therefrom. Such modification of each display item allows the display system 20 to be easily adapted for use with varying players, teams and sports events.

Figure 4:
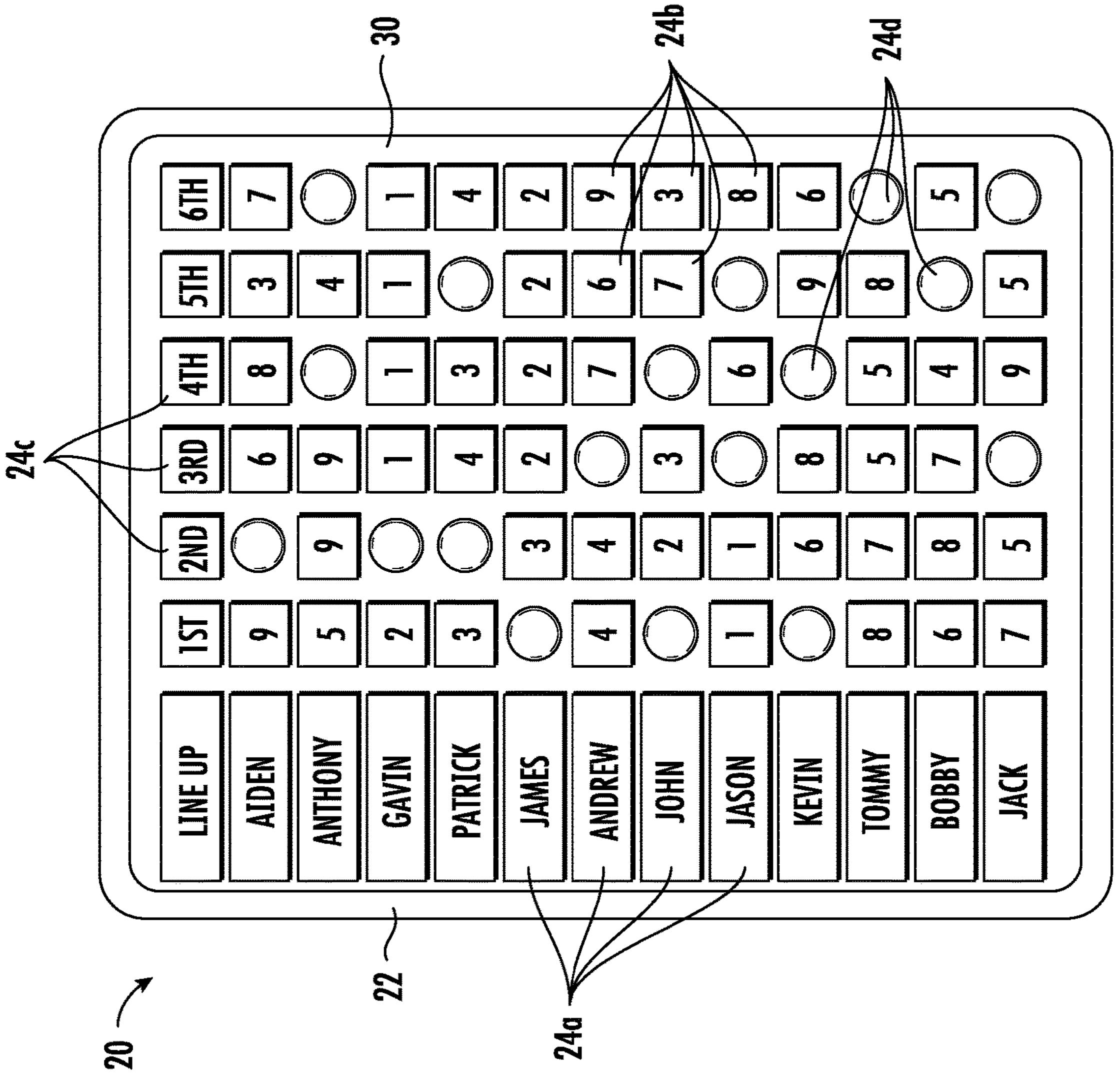
FIG. 4 is a front, perspective view of a display system according to another embodiment.

In the non-limiting embodiment illustrated in FIG. 4, the display items may additionally include a fourth set of display items configured to represent a fourth type of information. The fourth set of display items 24*d* are non-positionally indicative, may include information or lack thereof indicating periods in which a player is not actively assigned to a position. These display items 24*d* may simply be blank, or alphanumerically indicative of a bench spot in the rotation or inning (perhaps "B" for bench or "0" for no positional number). For example, as shown in the FIG. 4, a fourth display item 24*d* is used to indicate that the first player is not assigned to a position during the second inning, the second player is not assigned to a position during the fourth and sixth innings, the third player is not assigned to a position during the second inning and so on. Although this information is inherently present in embodiments that do not include the fourth set of display items 24*d* (see FIG. 1) inclusion of the fourth set of display items 24*d* eases the visual identification of the players that are not participating during each period or segment.

In an embodiment, to facilitate this visual distinction between the display items indicating a position and the display items indicating an absence of a position, the aesthetic appearance of the display items within the fourth set 24*d* is different than of the display items within any of the other sets 24*a*-24*c*. In the illustrated, non-limiting embodiment, each display item 24*d* is a dark magnet. However, embodiments where the front surface 34 of the display item 24*d* is dark, has an X, or other indicator to suggest or represent that no position is assigned thereto is within the scope of the disclosure.

A display system 20 as illustrated and described herein may be used to clearly illustrate a line-up for a sporting event.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A display system for a sporting event, the display system comprising:

a display base;

a first set of display items affixable to said display base; and a second set of display items affixable to said display base, a third set of display items affixable to said display base;

wherein a first type of information relevant to the sporting event is presentable on said first set of display items, and a second type of information relevant to the sporting event is presentable on said second set of display items, and a third type of information relevant to the sporting event is presentable on said third set of display items, said first type of information being different from said second type of information;

wherein said first set of display items and said second set of display items are affixable to said display base to indicate a plurality of positions of at least one participant of the sporting event during each of a plurality of time segments of the sporting event simultaneously; and wherein said third type of information represents one or more players that are not assigned a position during a period of the sporting event.

2. The display system of claim 1, wherein at least one of said first set of display items and said second set of display items is affixable to said display base via a magnet.

3. The display system of claim 1, wherein at least one of said first set of display items and said second set of display items is affixable to said display base via an adhesive.

4. The display system of claim 1, wherein at least one of said first set of display items and said second set of display items is affixable to said display base via insertion of a portion of said display items into said display base.

5. The display system of claim 1, wherein the sporting event is a baseball game.

6. The display system of claim 1, wherein said first set of information includes a roster of participants in the sporting event.

7. The display system of claim 1, wherein said second set of information includes one or more positions associated with a team participating in the sporting event.

8. The display system of claim 1, wherein said third type of information represents one or more segments of the sporting event.

9. The display system of claim 1, wherein said third set of display items is visually distinct from said first set of display items and said second set of display items.

10. The display system of claim 9, wherein said third set of display items comprises a plurality of non-positionally indicative magnets.

11. The display system of claim 1, wherein at least one of a size and a shape of the first set of display items is different than the size and the shape of the second set of display items.

12. The display system of claim 1, wherein at least one of said first set of display items and said second set of display items is modifiable.

13. A display system for a sporting event, the display system comprising:

a display base;

a first set of display items affixable to said display base; and a second set of display items affixable to said display base, a third set of display items affixable to said display base, said third set of display items being visually distinct from said first set of display items and said second set of display items, said third set of display items including a plurality of non-positionally indicative magnets;

wherein a first type of information relevant to the sporting event is presentable on said first set of display items, and a second type of information relevant to the sporting event is presentable on said second set of display items, and a third type of information relevant to the sporting event is presentable on said third set of display items, said first type of information being different from said second type of information;

wherein said first set of display items and said second set of display items are affixable to said display base to indicate a plurality of positions of at least one participant of the sporting event during each of a plurality of time segments of the sporting event simultaneously.

* * * * *